June 23, 1970 D. H. WILLIS 3,517,115

AUTOMATIC CHROMA CONTROL CIRCUIT

Filed May 29, 1967 3 Sheets-Sheet 1

INVENTOR

DONALD H. WILLIS

BY [signature]

ATTORNEY

June 23, 1970 D. H. WILLIS 3,517,115

AUTOMATIC CHROMA CONTROL CIRCUIT

Filed May 29, 1967 2 Sheets-Sheet 2

INVENTOR
DONALD H. WILLIS
BY Donald H. Timbie
ATTORNEY

United States Patent Office 3,517,115
Patented June 23, 1970

3,517,115

AUTOMATIC CHROMA CONTROL CIRCUIT

Donald H. Willis, Indianapolis, Ind., assignor to RCA Corporation, a corporation of Delaware Filed May 29, 1967, Ser. No. 641,922
Int. Cl. H04n 9/48
U.S. Cl. 178—5.4 8 Claims

ABSTRACT OF THE DISCLOSURE

In either closed loop or open loop A.C.C. circuits, the A.C.C. voltage derived from the color synchronizing bursts at the output of the burst amplifier is modified by noise induced voltage at the input of the burst amplifier. The noise induced voltage at the input of the burst amplifier is applied to the A.C.C. circuit to compensate for the adverse changes in the A.C.C. voltage due to noise applied to the burst amplifier.

This invention relates to an improvement in automatic chroma control (A.C.C.) circuits in a color television receiver.

Their purpose is to keep the desired variation in the amplitude of the chrominance signals within a given range and hence aid in maintaining the proper color saturation in the picture. In receivers designed to operate in a color television system presently approved for use in the U.S.A., A.C.C. circuits have been provided that derive a D.C. voltage proportional to the amplitude of the color synchronizing bursts and utilize it to vary the gain of the chrominance signal amplifier inversely with the changes in amplitude of the bursts. The bursts are selected for this purpose because they are transmitted with a fixed predetermined amplitude relative to a saturated color amplitude and because any variations in their amplitude are usually proportional to the undesired variations in amplitude in the chrominance signal. In an open loop A.C.C. system the burst and chrominance amplifiers are operated in parallel so that the A.C.C. voltage derived from the bursts at the output of the burst amplifier and applied to control the gain of the chrominance amplifier is not affected by the gain of the chrominance amplifier. In a closed loop A.C.C. system the chrominance and burst amplifiers are in series so that the A.C.C. voltage derived from the bursts at the output of the burst amplifier is directly affected by the gain of the chrominance amplifier to which it is applied.

In either type of A.C.C. circuit, variations in the gain of the burst amplifier caused by noise induced voltage at its input electrode can produce corresponding erroneous changes in the amplitude of the bursts at its output and in the value of the A.C.C. voltage derived from them. The application of this A.C.C. voltage to the chrominance amplifier produces a corresponding erroneous change in its gain so that the chrominance signals at its output do not have the desired amplitude.

It is, therefore, an object of this invention to provide an improvement in A.C.C. systems that compensates for errors introduced by noise at the input of the burst amplifier.

This objective is achieved in accordance with this invention by modifying the A.C.C. voltage derived from the bursts with the noise induced voltage at the input electrode of the burst amplifier.

Figure 1:
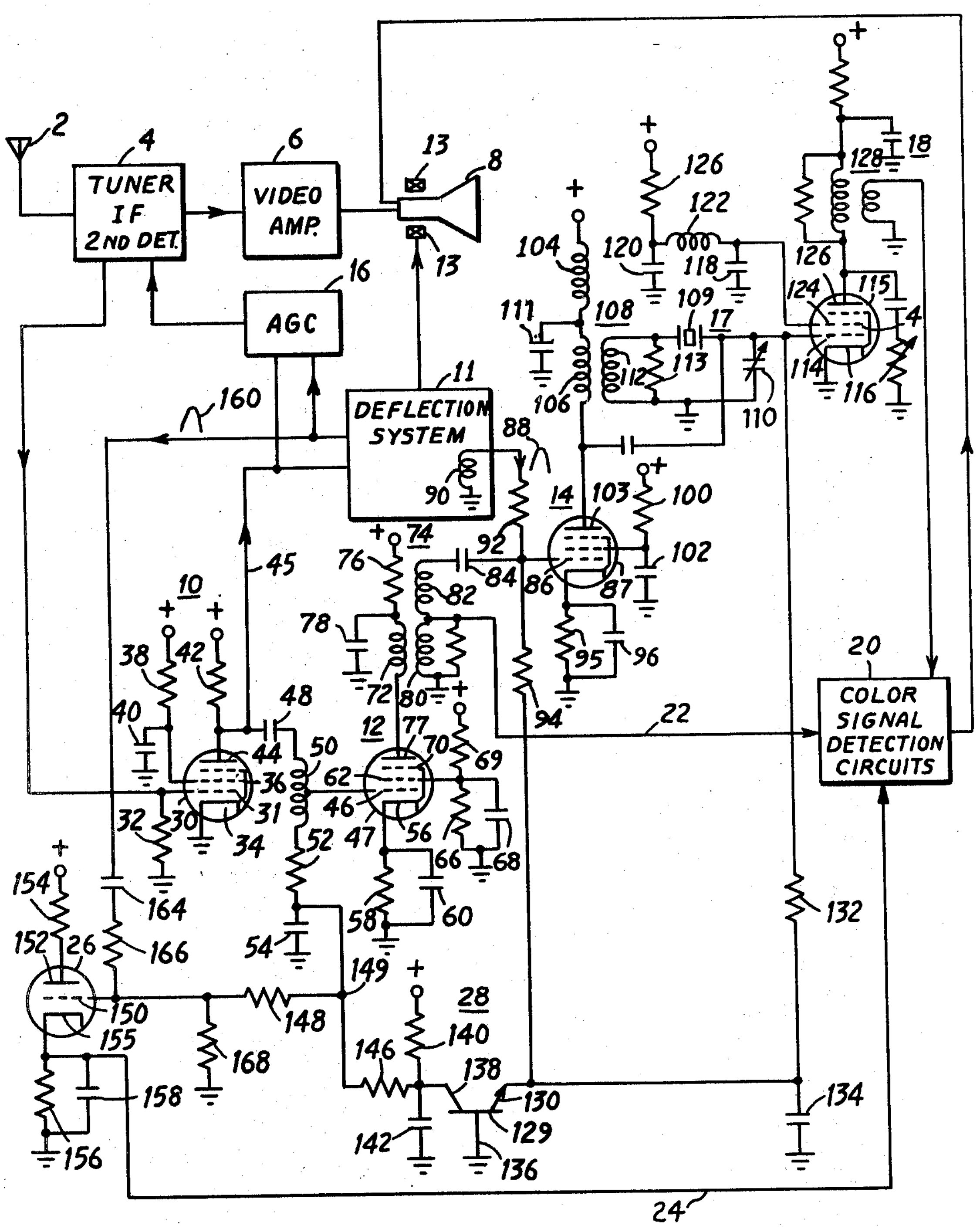
Figure 2:
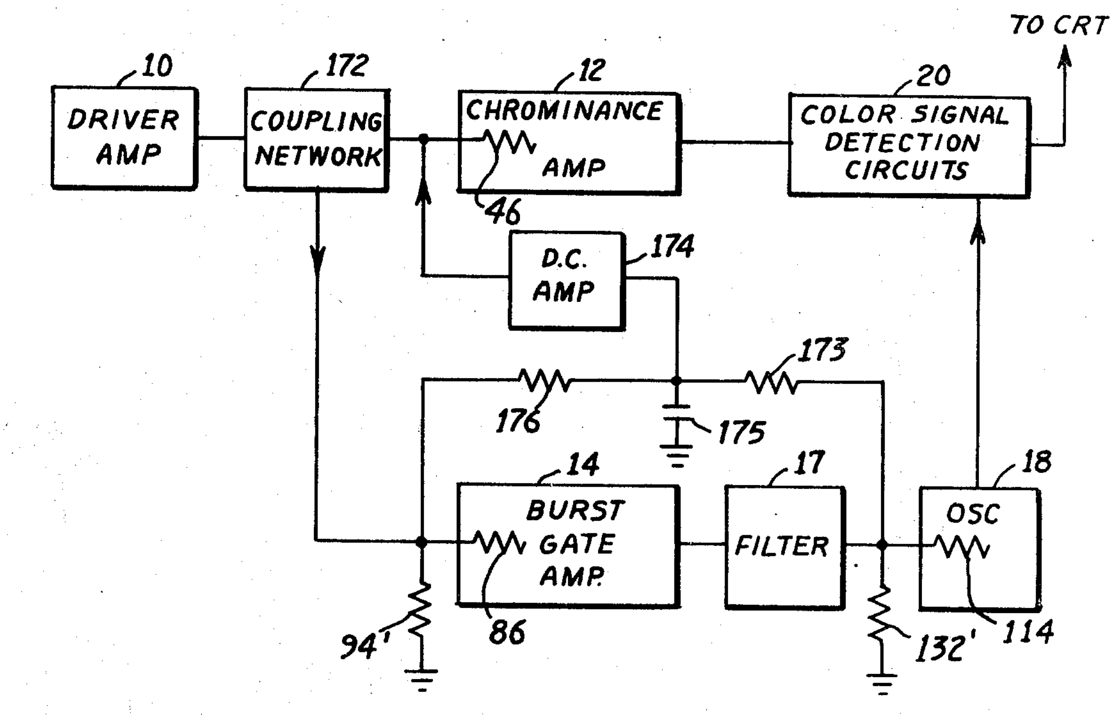

The features of the invention which are presently believed to be novel are set forth with particularity in the appended claims. The invention, both as to its organization and manner of operation, may be best understood by reference to the following description, taken in conjunction with the accompanying drawings in which:

FIG. 1 illustrates the application of this invention to a color television receiver having a closed loop type of A.C.C. system employing a current responsive amplifier to provide an amplified A.C.C. voltage, and FIG. 2 illustrates the application of this invention to a color television receiver having an open loop A.C.C. system employing a voltage responsive amplifier to provide an A.C.C. voltage.

The general organization of the various components of the receiver of FIG. 1 is as follows. An antenna 2 intercepts transmitted signals and applies them to a tuner, I.F. amplifier and second detector, all designated by the numeral 4. Detected signals are amplified in a video amplifier 6 and applied to a cathode ray tube 8. They are also applied via a driver amplifier 10 to synchronize a deflection system 11 that generates deflection currents for the windings 13 that cause the electron beam of the cathode ray tube 8 to scan a raster. An output of the amplifier 10 and keying pulses from the deflection system 11 are applied to an A.G.C. circuit 16 so as to produce a voltage that controls the gain of the tuner and/or I.F. amplifier 4 in such manner as to maintain the low frequency components of the video signal at the input of the video amplifier 6 at a desired level.

In the chrominance channel, the chrominance signals and color synchronizing bursts appearing at the output of the amplifier 10 are selectively amplified by a chrominance amplifier 12, the gain of which is to be controlled in accordance with this invention. Separation of the bursts from the output of the chrominance amplifier 12 is effected by a burst separating means shown as a burst gate amplifier 14 that is keyed to pass signals only when the bursts are present. The color subcarrier frequency of the bursts is selected by a sharply tuned crystal filter 17 and applied to a color reference oscillator 18 so as to synchronize its phase and frequency. The output of the oscillator 18 is applied to color signal detection circuits 20 where it is combined with chrominance signals, coupled from the output of the chrominance amplifier 12 via a lead 22, to produce signals that control the color of the pictures produced by the cathode ray tube 8. Color synchronizing bursts are prevented from interferring with the operation of the color signal detection circuits by pulses supplied to it via a lead 24 from a keyed burst blanking triode 26. The triode 26 also aids in translating the A.C.C. potential provided by a circuit 28 to control the gain of the chrominance amplifier 12.

In particular, the details of the driver amplifier 10 are as follows. It includes a pentode tube 30 having a control grid 31 coupled to the output of the second detector 4. A grid leak resistor 32 is connected between ground and the grid 31, and the cathode 34 is connected to ground. The screen grid 36 is provided with a suitably bypassed positive operating potential by a screen resistor 38 and bypass capacitor 40. Amplified video signals are produced across an anode resistor 42 that is connected between the anode 44 and a point of positive operating potential. These video signals are applied via a lead 45 to the A.G.C. system 16 and the deflection system 11.

Chrominance signals and the color synchronizing bursts are separated from the rest of the amplified video signals appearing at the anode 44 and applied to a control grid 46 of the pentode 47 of the chrominance amplifier 12 by a series resonant circuit to signal ground comprised of a D.C. blocking capacitor 48, an inductor 50, a Q spoiling resistor 52 and a bypass capacitor 54. The cathode 56 of the pentode 47 is biased by a paralleled resistor 58 and capacitor 60. Operating potential for the screen grid 62 is supplied from a point of positive voltage via a voltage divider formed by resistors 69 and 66. Suitable bypass of signal frequencies is provided by a capacitor 68, and the suppressor grid 70 is internally connected to the cathode 56. Amplified chrominance signals and color synchronizing bursts are produced across a primary winding 72 of a bandpass output transformer 74 by connecting the winding in series with a voltage dropping resistor 76 between the anode 77 and a point of positive D.C. potential. Suitable signal bypass is provided by a capacitor 78. Chrominance signals and burst across a lower portion 80 of the secondary winding of the transformer 74 are coupled via a lead 22 to the color signal detection circuits 20. Both the primary winding 72 and the secondary winding 80, 82 are tuned to resonance for the chrominance signals by inherent stray capacitance.

The chrominance signals and bursts across the entire secondary winding are coupled by a capacitor 84 to a control grid 86 of a pentode 87 of the burst gate amplifier 14. The pentode 87 is rendered conductive when the bursts are present by coupling positive pulses 88 from an auxiliary winding 90 on the line deflection transformer, not shown, to the grid 86 via a voltage divider comprised of a resistor 92 and the grid leak resistor 94. Between bursts, when the chrominance signals are present at the grid 86, the pentode 87 is rendered non-conductive by reason of the positive voltage stored by the long RC time constant of the parallel cathode resistor 95 and capacitor 96. Suitable positive potential for the screen is supplied by resistor 100 and a bypass capacitor 102. Positive operating potential for the anode 103 is supplied via a choke 104 and a primary winding 106 of an output transformer 108, a signal ground being supplied by a capacitor 111.

Selection of the color subcarrier frequency from the amplified color synchronizing bursts appearing across the primary winding 106 is accomplished by the filter 17, which is comprised of a crystal 109 and a variable capacitor 110 connected in series across the secondary winding 112 of the transformer 108. The junction of the winding 112 and the capacitor 110 is connected to ground. The value of impedance coupled into the circuit via the primary winding 106 is reduced by making the numbers of turns on the secondary winding 112 small in comparison with the number of turns in the primary winding 106, and the effective inductance of the secondary winding 112 is reduced by connection of a resistor 113, which has a low value, in shunt with the secondary winding 112. The crystal 109 is ground so that it has an inductive reactance at the frequency of the color subcarrier and the capacitor 110 is adjusted so that the circuit 112, 109, 110 and 113 is resonant at the subcarrier frequency. The Q of this circuit is sufficiently high to practically eliminate the flow of currents of other frequencies during the periods when the bursts are present. The voltage wave of color subcarrier frequency that is produced across the capacitor 110 is applied to a control grid 114 of a pentode amplifier 115 of the oscillator 18 so as to synchronize its phase and frequency.

In the oscillator 18 the cathode 116 is connected to ground and a parallel resonant circuit, comprised of a tuning capacitor 118, a bypass capacitor 120 and inductor 122, is connected between ground and the screen grid 124. Positive operating potential for the screen grid is supplied via a resistor 126. The capacitor 120 is a bypass capacitor so that the inductor 122 is effectively in parallel with the capacitor 118 at the oscillator frequency. It will be noted that the crystal 109 and capacitor 110 are effectively in parallel between the control grid 114 and ground so that the control grid 114, cathode 116 and screen grid 124 operate like a tuned plate tuned grid oscillator. The strength of the oscillations can be adjusted by varying the inductance of the inductor 122, and they are electron coupled to the anode 126. An output transformer 128 couples the oscillations to the color signal detection circuits 20.

The oscillator 18 operates as follows to provide a control voltage that varies with the amplitude of the bursts. Whether or not color synchronizing bursts are present in the video signals, the oscillator 18 continues to operate. In the absence of the bursts, the oscillator action produces an alternating current voltage at the grid 114 which is clamped by the grid 114 and the cathode 116 so as to produce a negative D.C. voltage component at the grid 114. The magnitude of the alternating current wave at the grid 114, and hence the magnitude of the D.C. voltage component, can be adjusted within limits by changing the inductance of the inductor 122. When the bursts are present, and when their subcarrier frequency is added in phase with the alternating current wave produced at the grid 114 by the oscillator action, the D.C. voltage component produced thereat is increased in proportion to the amplitude of the fundamental frequency of the bursts and hence in proportion to the amplitude of the bursts. The D.C. voltage component produces a corresponding direct current in the grid leak path to be discussed. The burst gate amplifier 14, filter 17, grid 114 and the cathode 116 thus constitute means coupled to the output of the chrominance amplifiers 12 for producing a direct current control voltage that varies in value in accordance with the amplitude variations of the bursts.

The A.C.C. circuit 28 is comprised of a current responsive amplifier such as transistor 129 having its emitter 130 connected via a grid leak resistor 132 to the grid 114 of the oscillator pentode 115. A capacitor 134 is connected between the emitter 130 and ground for purposes of removing the color subcarrier frequency from the emitter 130. A ground connection is made to the base electrode 136 of the transistor 129, and its collector 138 is connected by a load resistor 140 to a point of positive potential. Due to the fact that color synchronizing bursts are not transmitted during the field or vertical blanking periods, the alternating current wave supplied from the capacitor 110 to the grid 114 of the pentode 115 decays in amplitude during these periods, thus causing the D.C. voltage component at the grid 114 to be reduced and introducing field frequecny components into the current supplied to the emitter 130. A capacitor 142 connected between the collector 138 and ground in combination with the load resistor 140 forms a filter that aids in removing these components from the A.C.C. signal.

In the grid leak path for the grid 114 of the oscillator amplifier 115, a small portion of the grid leak current flows between the emitter 130, and the grounded base 136. Transistor action causes the remainder of the grid leak current to flow through the collector 138, the load resistor 140 and the power supply, not shown, and produce at the collector 138 a voltage that varies in the same sense as the rectified voltage at the grid 114. Both voltages change in a negative direction as the amplitude of the bursts increases. Because the resistance of the load resistor 140 is large, the changes in the D.C. voltage at the collector 138 are much greater than changes in the D.C. component of the voltage at the grid 114. A distinct advantage of the circuit is that the small impedance of the forward biased base-emitter junction permits the presence of the transistor 128 to have little or no effect on the operation of the oscillator 18.

Although the amplified voltage at the collector 138 varies in the correct direction for A.C.C. purposes, its variations occur within a range that is too positive for direct application to the gain control grid 46 of the chrominance amplifier 12, and, therefore, means are provided for translating it. For this purpose resistors 146 and 148 are connected in series between the collector 138 and a source of negative potential, and the D.C. translated A.C.C. signal is produced at their junction 149. It is applied to the grid 46 by a connection between the junction 149 and the ungrounded side of a filter capacitor 54. The capacitor 54 further reduces signal components of field frequency.

Although other sources of negative voltage for the resistor 148 could be used, the particular one illustrated is the grid 150 of the blanker triode 26. Its anode 152 is connected to a point of positive operating potential by a resistor 154, and its cathode 155 is biased by a parallel resistor 156 and capacitor 158. Positive pulses 160 are derived from the line deflection circuit in the deflection system 11 and are coupled to the grid 150 by a capacitor 164, resistor 166 and grid leak resistor 168. These components serve to clip and clamp the pulses 160 so as to cause the triode 26 to conduct during the time when the color synchronizing bursts are present in the chrominance signals applied via the lead 22 to the color signal detection circuits 20. The conduction of the triode 26 produces positive pulses at the cathode 155 that are coupled via the lead 24 to a point, not shown, in the color signal detection circuit 20 so as to prevent the bursts from being applied to portions of the circuit 20 with which they could interfere. During the crest of the pulses 160, capacitor 164 is charged, and in between pulses it slowly discharges to ground through the resistors 166 and 168 so as to produce a negative D.C. voltage at their junction. The bypass capacitor 54 and the resistor 148 form a filter that reduces the amplitude of the pulse voltage at the grid 46. The resistance of the resistors 148 and 146 is large enough in comparison with the resistance of the load resistor 140 as to have little effect on the value of the current at the collector 138.

If the grid leak resistor 94 were connected to ground rather than to the emitter 130, positive noise at the grid 86 of the burst gate amplifier tube 87 could cause the grid to draw current and to charge the capacitor 84, as well as any inherent capacitance between the grid and ground, to a negative voltage that reduces the gain of the burst gate amplifier 14. When this occurs, the amplitude of the bursts applied to the crystal filter 17, the fundamental frequency across the capacitor 110, and the D.C. component of the voltage at the grid 114 of the oscillator amplifier 115 are all reduced. As a result, less leakage current flows between the grid 114 and the emitter 130 and the A.C.C. voltage across the load resistor 140 diminishes. This increases the gain of the chrominance amplifying stage 12 so as to increase the level of the chrominance signals applied to the color signal demodulation circuit 20. This change in level is an error inasmuch as it is caused by the noise at the grid 86 of the burst gate amplifier 87 and not by any change in the amplitude of the bursts applied thereto.

In accordance with this invention, such an error may be minimized by returning the grid leak resistor 94 to the emitter 130 as described, rather than to ground. With this connection, an increase in the noise at the grid 86 increases the current flowing into the emitter 130 from the grid leak resistor 94 so as to tend to compensate for the decrease in current flowing between the emitter 130 and the grid 114. If the increase in the compensating current between the grid 86 and the emitter 130 is exactly equal to the decrease in current flowing between the grid 114 and the emitter 130, no change is produced in the A.C.C. voltage by the presence of noise as the total current flowing through the emitter 130 is unaffected by the noise. The amount of compensating current is determined by the ratio of the resistors 92 and 94 and their equivalent parallel resistance.

It is important to note, however, that noise at the grid 86 has no significant direct effect on the voltage at the grid 114 because the filter 17 has such a narrow bandwidth. Any changes in the voltage at the grid 114 are caused indirectly through the change that the noise at the grid 86 produces in the amplitude of the bursts. This is important because as the noise at the grid 86 increases, the amplitude of the bursts and the negative D.C. voltage component at the grid 114 decreases.

Although other circuit parameters could be used, the following is a list of those which have been found to provide satisfactory operation.

Resistor 132—68K ohms
Capacitor 134—.1 μf.
Transistor 129—2N3565
Capacitor 142—.047 μf.
Resistors:
94—33K ohms
140—3.16M ohms
146—470K ohms
148—4.7M ohms
168—220K ohms
Capacitor 54—0.1 μf.

Reference is now made to FIG. 2 in which certain stages shown in FIG. 1 in schematic form are illustrated by rectangles indicated by the same numerals. The changes for adopting the invention for use in an open loop A.C.C. circuit utilizing a voltage responsive amplifier are indicated in schematic form. The output of the driver amplifier 10 is coupled via a network 172, which may be the same as 48, 50, 52 and 54 of FIG. 1, to the chrominance amplifier 12, and its output is applied to the chrominance signal demodulation circuits 20. However, the control grid 86 of the burst gate amplifier 14 is connected to a suitable point in the coupling network 172 rather than to the output of the chrominance amplifier 12, as in FIG. 1. Changes in the gain of the chrominance amplifier 12 have no effect on the bursts supplied to the burst gate amplifier 14, and hence the A.C.C. circuit is of the open loop type. As the grid leak resistor 94' and 132' of the burst gate amplifier and the oscillator 18 may have slightly different values than in FIG. 1, they are indicated by primed numbers.

As explained in connection with FIG. 1, the voltage at the grid 114 of the oscillator 18 has a D.C. component that changes with the amplitude of the color synchronizing bursts. In the circuit, the grid 114 is coupled via a resistor 173 and an A.C. bypass capacitor 175 to the input of a D.C. voltage amplifier 174, and its output is connected to the control grid 46 of the chrominance amplifier 12. However, as discussed in connection with FIG. 1, the D.C. voltage at the grid 114 can be altered by changes in the gain of the burst amplifier 14 produced by noise at its grid 86. In order to compensate for such alteration, a resistor 176 is connected between the grid 86 and the junction between the resistor 173 and the capacitor 175. Precise compensation can be achieved by selection of suitable relative values for the resistors 173 and 176. The sum of their resistance is such that their presence does not adversely affect the operation of either the burst gate amplifier 14 or the oscillator 18.

What is claimed is:

1. In a color television receiver, the combination of,
a color synchronizing burst gate amplifier having an input electrode and an output electrode,
means coupling color synchronizing bursts to said input electrode,
control voltage deriving means coupled to said output electrode of said burst gate amplifier for deriving a control voltage having a direct current component that varies in value in response to variations in the amplitude of the color synchronizing bursts at said output electrode of said burst gate amplifier,
a chrominance signal amplifier, and
means for varying the gain of said chrominance signal amplifier in response to a predetermined combination of the control voltage and any direct current component of voltage at said input electrode of said burst gate amplifier.

2. In a color television receiver, the combination of,
a burst gate amplifier having an input electrode and an output electrode,
means for applying color synchronizing bursts to said input electrode, control voltage deriving means coupled to said output electrode of said burst gate amplifier for deriving a control voltage having a direct current component that varies in value in response to variations in amplitude of the color synchronizing bursts at said output electrode of said burst gate amplifier, a transistor having emitter, base and collector electrodes, a resistor connected between said control voltage deriving means and said emitter electrode, a leak resistor connected between said input electrode of said burst gate amplifier and said emitter electrode, a direct current connection between said base electrode and a point of reference potential, a chrominance amplifier having a gain control electrode, and an output circuit direct current coupling said collector electrode to said gain control electrode of said chrominance signal amplifier.

3. In a color television receiver, the combination of, a chrominance signal amplifier having an input electrode and an output electrode, a burst gate amplifier having a control electrode and an output electrode, said control electrode being coupled to said output electrode of said chrominance signal amplifier, an oscillator having a control grid, means for injection locking the phase and frequency of said oscillator coupled between said output electrode of said burst gate amplifier and said grid of said oscillator, a first grid leak resistor and an oscillator frequency bypass capacitor connected in series in the order named between said grid of said oscillator and a point of reference potential, a transistor having emitter, base and collector electrodes, a direct current connection between said emitter of said transistor and the junction of said first grid leak resistor and said bypass capacitor, a direct current connection between said base electrode of said transistor and a point of said reference potential, a second grid leak resistor connected between said emitter electrode and said control electrode of said burst gate amplifier, a load resistor connected between said collector electrode and a point of operating potential, and means direct current coupling said collector electrode of said transistor to said input electrode of said chrominance signal amplifier.

4. In a color television receiver, the combination comprising, a color synchronizing burst gate amplifier having an input electrode and an output, a leak resistor connected between a point of reference potential and said input electrode, means coupled to the output of said burst gate amplifier for deriving a direct current voltage that varies in value with the amplitude of the color synchronizing burst at the output of said burst gate amplifier, first and second resistors connected in series between said input electrode of said burst gate amplifier and said means, a chrominance signal amplifier having an input electrode, a source of chrominance signals and color synchronizing bursts coupled to said input electrode of said burst gate amplifier and said input electrode of said chrominance signal amplifier, and means direct current coupling the junction of said first and second resistors to the chrominance amplifier so as to control the gain of said chrominance signal amplifier.

5. In a color television receiver, the combination of, a source of video signals containing chrominance signals and periodic bursts, a chrominance amplifier having an input and an output, a burst gate amplifier having a pair of input electrodes and an output electrode, means for applying to one of said input electrodes of said burst gate amplifier a cut off bias voltage, means coupling an output of said chrominance amplifier between said input electrodes of said burst gate amplifier, a source of keying pulses coupled between said input electrodes of said burst gate amplifier so as to overcome said cut off bias voltage during the presence of said bursts, means coupled to said output electrode of said burst gate amplifier for deriving a D.C. control voltage that varies in value as the bursts vary in amplitude, a current controlled amplifier having input and output circuits, a direct current connection between said input circuit of said current controlled amplifier and said means for providing a control signal, means coupling the output circuit of said current controlled amplifier to said input of said chrominance amplifier so as to control its gain, and a direct current connection between one of said input electrodes of said burst gate amplifier and said input circuit of said current controlled amplifier.

6. The combination as set forth in claim 5 wherein:

said current controlled amplifier is a transistor having emitter, base and collector electrodes, said base electrode is connected to a point of reference potential, said input circuit of said current controlled amplifier lies between said emitter and base electrodes, and said direct current connections are made to said emitter electrode.

7. In a color television receiver, the combination of, a source of video signals including periodic bursts and chrominance signals, a chrominance amplifier having a gain control electrode, and an output, a burst gate amplifier having a pair of input electrodes, means including a capacitor for coupling said output of said chrominance amplifier to one of said input electrodes of said burst gate amplifier, whereby noise coupled along with the signals from said output of said chrominance amplifier to said one input electrode of said burst gate amplifier can cause it to draw current and charge said capacitor so as to produce a D.C. voltage at said one input electrode of said burst gate amplifier that reduces its gain, means coupled to said output of said burst gate amplifier for deriving a D.C. control voltage that varies in value as said bursts at said output vary in amplitude, a current controlled amplifier having an input electrode, a common electrode and an output electrode, means connecting said common electrode to a point of reference potential, a load impedance connected between said output electrode and a point of operating potential, a resistor connected between said input electrode of said current controlled amplifier and said means for deriving the control voltage so that current flows therebetween that is proportional to said control voltage and which is therefore reduced when the gain of said burst gate is reduced by the presence of noise at the said one input electrode thereof, a resistor connected between said one input electrode of said burst gate amplifier and said input electrode of said current controlled amplifier so as to permit a current to flow therebetween that tends to compensate for the reduction in current flowing between said means for deriving said control voltage and said input electrode, and means for direct current coupling said output electrode of said current controlled amplifier to said gain control electrode of said chorminance amplifier so as to vary its gain in accordance with changes in voltage produced at said output electrode.

8. The combination as set forth in claim 7 wherein said current controlled amplifier is a transistor, the said input electrode being the emitter thereof, the said common electrode being the base and the said output electrode being the collector.

References Cited

UNITED STATES PATENTS 3,141,064 7/1964 Macovski ----------- 178—5.4

ROBERT L. GRIFFIN, Primary Examiner

R. L. RICHARDSON, Assistant Examiner